(12) United States Patent
Bian et al.

(10) Patent No.: US 10,746,667 B2
(45) Date of Patent: Aug. 18, 2020

(54) FLUORESCENT PENETRANT INSPECTION SYSTEM AND METHOD

(71) Applicant: General Electric Company, Schenectady, NY (US)

(72) Inventors: Xiao Bian, Niskayuna, NY (US); John Karigiannis, Bromont (CA); Stephane Harel, Bromont (CA); Steeves Bouchard, Bromont (CA); Maxime Beaudoin Pouliot, Bromont (CA); Wayne Grady, Cincinnati, OH (US); David Scott Diwinsky, West Chester, OH (US); Bernard Patrick Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 70 days.

(21) Appl. No.: 16/201,322

(22) Filed: Nov. 27, 2018

(65) Prior Publication Data
US 2020/0166467 A1 May 28, 2020

(51) Int. Cl.
 *G01N 21/91* (2006.01)
 *G01N 21/64* (2006.01)

(52) U.S. Cl.
 CPC .......... *G01N 21/91* (2013.01); *G01N 21/643* (2013.01); *G01N 21/6456* (2013.01); *G01N 2021/6439* (2013.01)

(58) Field of Classification Search
 CPC .......... G01N 21/91; G01N 21/643; G01N 2021/6439; G01N 21/6456
 See application file for complete search history.

(56) References Cited

U.S. PATENT DOCUMENTS 2,259,400 A * 10/1941 Switzer .................. G01N 21/91
250/302
3,114,039 A * 12/1963 Switzer .................. G01N 21/91
250/302

(Continued)

FOREIGN PATENT DOCUMENTS

CN 202471613 U 10/2012
CN 206696197 U 12/2017

(Continued)

OTHER PUBLICATIONS

Tang et al. "Automated Inspection System for Detecting Metal Surface Cracks from Fluorescent Penetrant Images" Machine Vision Applications in Industrial Inspection III; vol. 2423; Mar. 1995 (15 pages).

(Continued)

*Primary Examiner* — Blake C Riddick
(74) *Attorney, Agent, or Firm* — The Small Patent Law Group LLC; Dean D. Small (57) ABSTRACT

An inspection system includes an imaging device, visible light source, ultraviolet light source, and at least one processor. The imaging device generates a first image set of a work piece while the ultraviolet light source illuminates the work piece with ultraviolet light to cause fluorescent dye thereon to emit light, and generates a second image set of the work piece while the visible light source illuminates the work piece with visible light. The first and second image sets are generated at the same positions of the imaging device relative to the work piece. The processor maps the second image set to a computer design model of the work piece based on features depicted in the second image set and the positions of the imaging device. The processor determines a defect location on the work piece based on an analysis of the first image set and the computer design model.

20 Claims, 4 Drawing Sheets

(56) References Cited

U.S. PATENT DOCUMENTS

| | | | | |
|---|---|---|---|---|
| 3,341,010 | A * | 9/1967 | Switzer | G01N 21/91 209/3.1 |
| 3,547,827 | A * | 12/1970 | Switzer | G01N 21/91 252/301.19 |
| 3,708,665 | A * | 1/1973 | Prine | G01N 21/91 250/330 |
| 5,563,417 | A * | 10/1996 | Gillard | G01N 21/91 250/458.1 |
| 6,195,891 | B1 * | 3/2001 | Chen | B23P 6/007 250/458.1 |
| 6,701,615 | B2 | 3/2004 | Harding et al. | |
| 6,950,545 | B1 * | 9/2005 | Nomoto | G01N 21/91 356/237.2 |
| 7,215,807 | B2 | 5/2007 | Nomoto et al. | |
| 7,689,003 | B2 | 3/2010 | Shannon et al. | |
| 8,249,362 | B1 * | 8/2012 | Silver | G06K 9/481 382/141 |
| 8,866,891 | B2 | 10/2014 | Derrien et al. | |
| 9,020,878 | B2 | 4/2015 | Kush et al. | |
| 9,921,132 | B2 | 3/2018 | Nissen et al. | |
| 10,054,552 | B1 | 8/2018 | Frutuoso et al. | |
| 10,060,857 | B1 | 8/2018 | Bouchard et al. | |
| 10,082,387 | B2 | 9/2018 | Bergren et al. | |
| 2001/0015804 | A1 * | 8/2001 | Doyle, Jr. | G01N 21/91 356/241.1 |
| 2002/0154811 | A1 * | 10/2002 | Katsuta | G01N 21/91 382/151 |
| 2004/0153979 | A1 * | 8/2004 | Chang | G06F 30/39 716/56 |
| 2006/0142971 | A1 * | 6/2006 | Reich | G01C 17/00 702/150 |
| 2006/0186260 | A1 | 8/2006 | Magnuson et al. | |
| 2007/0217672 | A1 * | 9/2007 | Shannon | G06T 7/0006 382/152 |
| 2009/0074327 | A1 * | 3/2009 | Metayer | G07F 17/329 382/294 |
| 2012/0249779 | A1 | 10/2012 | Ji | |
| 2014/0185911 | A1 * | 7/2014 | Steffenson | G06T 7/75 382/141 |
| 2014/0212864 | A1 * | 7/2014 | Rios | G09B 23/285 434/270 |
| 2015/0178978 | A1 * | 6/2015 | Durand | G06T 19/20 382/128 |
| 2016/0313257 | A1 * | 10/2016 | Marivoet | G01N 21/9505 |
| 2017/0356849 | A1 | 12/2017 | Henderkott | |
| 2019/0043182 | A1 * | 2/2019 | Wang | G01N 21/8851 |
| 2019/0246082 | A1 * | 8/2019 | Pasquier | H04N 9/3194 |

FOREIGN PATENT DOCUMENTS

| | | |
|---|---|---|
| CN | 106328228 B | 2/2018 |
| JP | 4618501 B2 | 1/2011 |
| WO | 2014184337 A1 | 11/2014 |

OTHER PUBLICATIONS

Zheng et al. "Design of an Advanced Automatic Inspection System for Aircraft Parts based on Fluorescent Penetrant Inspection Analysis"; Insight—Non-Destructive Testing and Condition Monitoring; vol. 57, No. 1; Jan. 2015 (8 pages).

Domaschke et al. "Robot Guided White Light Interferometry for Crack Inspection on Airplane Engine Components" 41st International Symposium on Robotics; 2014 (7 pages).

Fuente et al. "Development and Demonstration of an Automated System for Limited Access Weld Inspections by Using Infrared Active Thermogoraphy" 7th International Symposium on NDT in Aerospace; 2015 (8 pages).

U.S. Appl. No. 15/814,965, filed Nov. 16, 2017 (75 pages).

Extended European Search Report for corresponding EP Application No. 19206684.3-1230 dated May 13, 2020.

* cited by examiner

FLUORESCENT PENETRANT INSPECTION SYSTEM AND METHOD

FIELD

The subject matter described herein relates to inspection of work pieces using fluorescence to detect defects.

BACKGROUND

Fluorescent penetrant indication (FPI) inspection utilizes a fluorescent dye applied onto a non-porous surface of a work piece. After removing a bulk of the dye from the surface, illuminating the surface in ultraviolet radiation in a dark room causes residual amounts of the dye within discontinuities of the work piece to emit a fluorescent glow that contrasts with the dark background, indicating the presence of the discontinuities. Each discontinuity may be a defect in the surface of the work piece, such as a crack, a chip, micro shrinkage, or spalling (e.g., flaking). The current protocol for FPI inspection is purely manual. For example, an inspector sits in a dark room or tent and manipulates an ultraviolet light source and/or a work piece to illuminate the work piece with ultraviolet light. Upon initial detection of a potential defect on the work piece, the inspector may brush or wipe the work piece to remove any dust and/or debris or other surface contamination that could represent a false positive. Then the inspector views the work piece under the ultraviolet light for a second time to determine the presence or absence of any defects on the surface of the work piece. If the inspector determines that the work piece has one or more defects, the inspector may designate the work piece for repair or may discard (e.g., scrap) the work piece.

The current manual process of FPI inspection is subjective and inconsistent. For example, the process is subject to the inherent human bias and/or error of the particular inspector performing the inspection. Although there may be adopted guidelines or rules for the inspectors to follow when determining whether to pass a work piece as satisfactory, send the work piece for repair, or discard the work piece, two different inspectors may apply the guidelines differently based on bias and/or error. It is possible that one inspector may decide to scrap a work piece that another inspector in the same situation would decide to pass or to repair.

Besides classifying specific work pieces for immediate use, repair, or discard, there may be limited information (e.g., data) collected during the current manual process for FPI inspection. For example, limited, if any, information may be collected and recorded regarding the defects which could be used for improving quality control and consistency. Such information may include the type of defects (e.g., cracks, spalling, chips, etc.), the size and/or shape of the defects, and number of defects, the location of the defects, etc.

Furthermore, the current manual process for FPI inspection is inefficient and also uncomfortable for the inspector. For example, it may be uncomfortable and/or undesirable for the inspector to spend extended periods of time in a dark room or tent manipulating an ultraviolet light source and/or work pieces covered in a fluorescent dye to inspect the work pieces.

SUMMARY

In one or more embodiments, an inspection system is provided that includes an imaging device, a visible light source, an ultraviolet light source, and one or more processors. The one or more processors are operably connected to the imaging device and the visible and ultraviolet light sources. The one or more processors are configured to control the imaging device to generate a first set of images of a work piece that has a fluorescent dye thereon using an ultraviolet light setting in which the ultraviolet light source is activated to illuminate the work piece with an ultraviolet light to cause the fluorescent dye to emit light. The imaging device generates the first set of images at one or more predetermined positions relative to the work piece to monitor the light emitted by the fluorescent dye. The one or more processors are configured to control the imaging device to generate a second set of images of the work piece using a visible light setting in which the visible light source is activated to illuminate the work piece with a visible light. The imaging device generates the second set of images at the same one or more predetermined positions relative to the work piece by monitoring the visible light reflected off the work piece. The one or more processors are configured to map the second set of images to a computer design model of the work piece based on features depicted in the second set of images and the one or more predetermined positions of the imaging device. The one or more processors determine a location of a defect on the work piece based on an analysis of the first set of images and the computer design model.

In one or more embodiments, a method for inspecting a work piece is provided. The method includes obtaining a first set of images of a work piece that has a fluorescent dye thereon using an ultraviolet light setting in which the work piece is illuminated with an ultraviolet light to cause the fluorescent dye to emit light. The first set is generated by an imaging device at one or more predetermined positions relative to the work piece to monitor the light emitted by the fluorescent dye. The method also includes obtaining a second set of images of the work piece using a visible light setting in which the work piece is illuminated by a visible light. The second set is generated by the imaging device at the same one or more predetermined positions relative to the work piece by monitoring the visible light reflected off the work piece. The method includes mapping the second set of images to a computer design model of the work piece based on features depicted in the second set of images and the one or more predetermined positions of the imaging device. The method further includes determining a location of a defect on the work piece based on an analysis of the first set of images and the computer design model.

In one or more embodiments, a method for inspecting a work piece is provided. The method includes obtaining a first image of a work piece that has a fluorescent dye thereon. The first image is generated by an imaging device disposed at a first position relative to the work piece using an ultraviolet light setting in which the work piece is illuminated with an ultraviolet light to cause the fluorescent dye to emit light. The method includes obtaining a second image of the work piece that is generated by the imaging device disposed at the first position using a visible light setting in which the work piece is illuminated by a visible light. The method also includes mapping the second image to a computer design model of the work piece, and, responsive to receiving an identification of one or more discontinuity locations in the first image, controlling a robotic arm to wipe the work piece along one or more regions of the work piece that correspond to the one or more discontinuity locations in the first image based on the computer design model. The method includes obtaining a third image of the work piece generated by the imaging device disposed at the first position using the ultraviolet light setting subsequent to the robotic arm wiping the work piece, and identifying a defect on the work piece based on a comparison between the one or more discontinuity locations in the first image and corresponding locations in the third image.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The embodiments described herein provide an inspection system and method for performing fluorescent penetrant indication (FPI) inspection of a work piece with improved efficiency and consistency over known FPI inspection techniques that are primarily manual. For example, the embodiments of the inspection system and method disclosed herein may be fully automated or at least semi-automated. The embodiments may automatically measure and record various information about the inspection settings and the discovered defects on the work pieces that create an objective track record and can be used for improving quality, consistency, manufacturing, and design.

The inspection system and method may include one or more image capturing devices, one or more light sources, one or more robotic arms, and one or more processors for inspecting work pieces. The system may generate image data depicting the work pieces, which may be rotor blades of a rotor assembly. The system performs FPI inspection, including automated bleed back operation, of the work pieces using deep learning algorithms. The inspection system and method described herein may provide improved efficiency and consistency over primarily manual FPI inspection techniques.

According to one or more embodiments, the inspection system and method obtain image data of a work piece under different lighting conditions. For example, one of the lighting conditions is an ultraviolet light setting. The work piece has a fluorescent dye thereon which emits a fluorescent glow in response to absorbing ultraviolet radiation. The image data is mapped to a computer design model of the work piece to orient and align features captured in the two-dimensional image data with corresponding physical features of the three-dimensional work piece. The image data under the different lighting conditions is analyzed to detect the presence of defects, such as cracks, spalling, chipping, or the like, along the surface of the work piece. By mapping the image data to the computer design model, the inspection system and method can determine both the location and size of any detected defects on the work piece based on the image data. The inspection system and method may automatically record various information, such as properties of the light settings, characteristics of the detected defects (e.g., location, size and dimension, shape, type, etc.), characteristics of the work piece, inspection results (e.g., pass, repair, or discard), and the like, in a computer-readable storage device.

Figure 1:
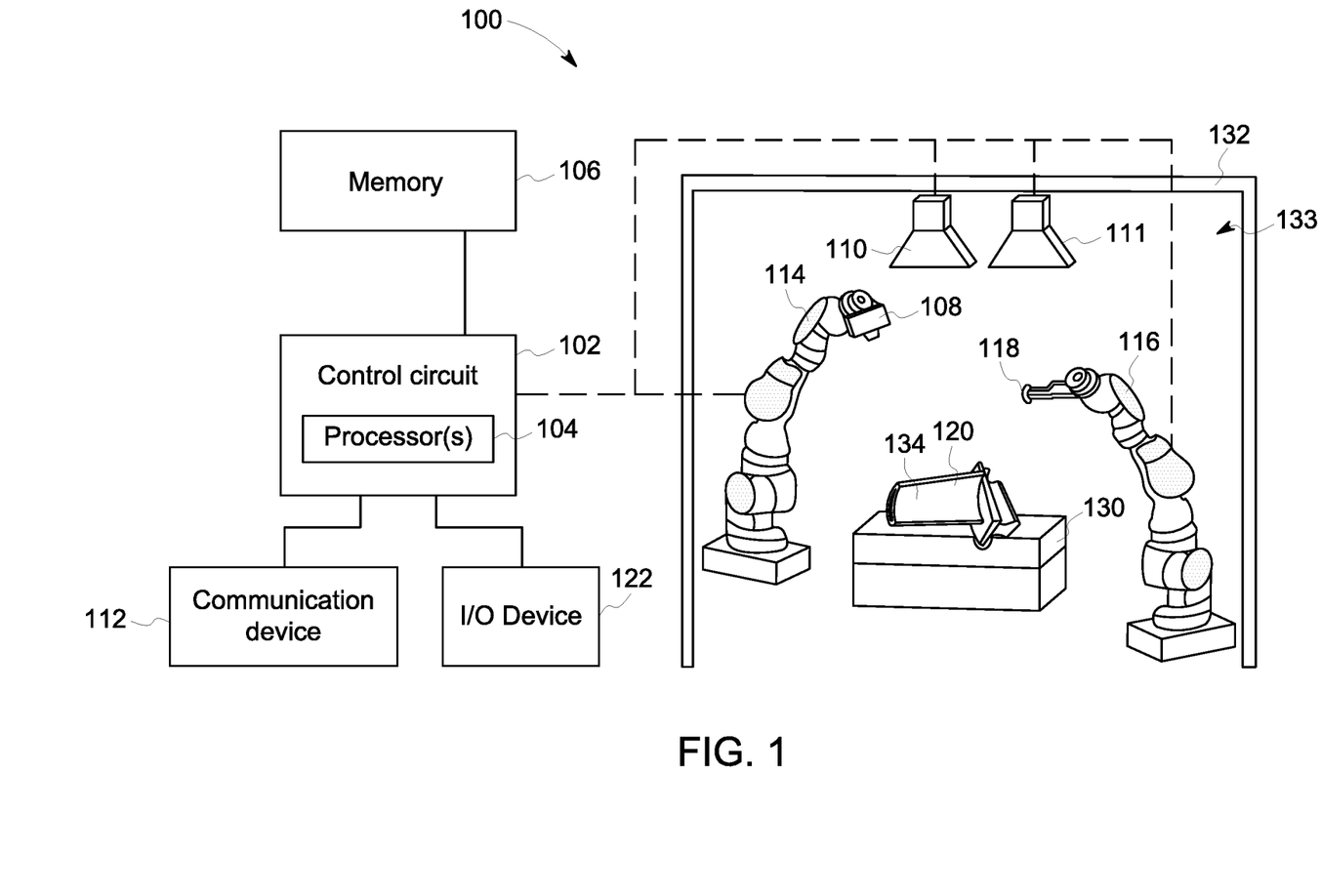
FIG. 1 is a block diagram of an inspection system according to an embodiment.

FIG. 1 is a block diagram of an inspection system 100 according to an embodiment. The inspection system 100 is configured to automatically acquire multiple images of a work piece 120 to support FPI inspection. For example, the inspection system 100 controls an imaging device 108 to capture images of the work piece 120 under different lighting modalities or conditions. The inspection system 100 controls the imaging device 108 to acquire the images from at least one selected position relative to the work piece 120, and optionally multiple different positions relative to the work piece 120. The inspection system 100 may be configured to automatically combine the images acquired from different positions to determine the area of coverage of the work piece 120 captured in the images. The images referred to herein are image data, and may be acquired as still images or frames of a video.

The inspection system 100 includes a control circuit 102 that is operably connected to a memory storage device 106. The control circuit 102 includes one or more processors 104 and associated circuitry. For example, the control circuit 102 includes and/or represents one or more hardware circuits or circuitry that include, are connected with, or that both include and are connected with the one or more processors 104, controllers, and/or other hardware logic-based devices. The control circuit 102 may include a central processing unit (CPU), one or more microprocessors, a graphics processing unit (GPU), or any other electronic component capable of processing inputted data according to specific logical instructions. For example, the control circuit 102 may execute programmed instructions stored on the memory storage device 106 or stored on another tangible and non-transitory computer readable medium.

The memory storage device 106 (also referred to herein as memory 106) is a tangible and non-transitory computer readable medium. The memory 106 may include or represent a flash memory, RAM, ROM, EEPROM, and/or the like. The control circuit 102 is operably connected to the imaging device 108 via a wired or wireless communication link. The control circuit 102 and the memory 106 obtain the images of the work piece 120 from the imaging device 108. The images may be stored in the memory 106 or stored in another storage device that is accessible to the control circuit 102.

The imaging device 108 may be or include at least one camera, sensor, scanner, or the like. The imaging device 108 (also referred to herein as imaging device 108) is configured to capture images in an ultraviolet (UV) light setting. For example, the imaging device 108 captures UV induced visible fluorescence and/or UV induced non-visible fluorescence from the work piece 120. The imaging device 108 is also configured to capture images in a visible light setting, such that the imaging device 108 captures visible light reflected off the work piece 120. The imaging device 108 may have one or more filters and/or lenses designed to restrict the wavelengths permitted through the filters and/or lenses. For example, the imaging device 108 may have a barrier filter that permits only light within a certain band of wavelengths in the visible light spectrum to penetrate the filter, excluding other wavelengths present in ambient light and/or white light. In addition, or alternatively, the imaging device 108 may have a barrier filter that permits only light within a certain band of wavelengths in the UV light spectrum to penetrate the filter. The imaging device 108 captures images that represent the subject matter in a field of view of the imaging device 108 at the time that the specific image was captured. Although the imaging device 108 is referred to in the singular herein, the imaging device 108 may have separate components for capturing UV induced fluorescence and visible light reflection.

In the illustrated embodiment, the inspection system 100 includes a visible light source 110, an ultraviolet light source 111, a first robotic arm 114, a second robotic arm 116, a communication device 112, and an input/output device 122 in addition to the control circuit 102, the memory 106, and the imaging device 108. The inspection system 100 may include additional components not illustrated in FIG. 1. In an alternative embodiment, the inspection system 100 may have at least some different components than the components shown in FIG. 1. For example, the inspection system 100 may only have one of the two robotic arms 114, 116 or at least three robotic arms in an alternative embodiment.

The imaging device 108 is mounted on the first robotic arm 114. The first robotic arm 114 is able to move the imaging device 108 along multiple axes (e.g., lateral, longitudinal, and vertical) relative to the work piece 120. The first robotic arm 114 can also adjust the angle of the imaging device 108 relative to the work piece 120. The first robotic arm 114 is operably connected to the control circuit 102 via a wired or wireless communication link. For example, the control circuit 102 controls the first robotic arm 114 to move the imaging device 108 to specific selected positions in space. Each selected position has specific location coordinates (e.g., x, y, z) in a coordinate system, and specific angle coordinates (e.g., rx, ry, rz). For example, the position of the imaging device 108 refers to both the location and angle of the imaging device 108. The location and angle may be relative to the work piece 120 or to another reference point. Alternatively, at least one of the location or the angle may be an absolute value. The control circuit 102 may control the first robotic arm 114 to move the imaging device 108 from a first position to a second position by (i) changing the location of the imaging device 108 only, (ii) changing the angle of the imaging device 108 only, or (iii) changing both the location and the angle of the imaging device 108. The first robotic arm 114 may have various actuators and/or rotation axes to manipulate the imaging device 108 as dictated by the control circuit 102. In an alternative embodiment, at least one of the light sources 110, 111 is mounted on the first robotic arm 114 with the imaging device 108, instead of being mounted remote from the robotic arm 114.

The inspection system 100 is configured to inspect work pieces 120 having various shapes and sizes. In the illustrated embodiment, the work piece 120 is a rotor blade, such as from a compressor or a turbine. Non-limiting examples of other types of work pieces 120 that may be inspected in the system 100 include nozzles, shafts, wheels, pistons, combustion chambers, and the like. For example, the work piece 120 may be a metal component of an engine, a vehicle, or other machinery. The work piece 120 may have a non-porous surface onto which a fluorescent dye is applied for FPI inspection.

The work piece 120 is disposed on a base 130 or platform. In the illustrated embodiment, the work piece 120 remains stationary in a fixed position on the base 130 throughout the inspection, and the imaging device 108 moves relative to the work piece 120 via the first robotic arm 114 to capture the images. In an alternative embodiment, the base 130 may be or include a turn table that rotates to adjust a position of the work piece 120 relative to the imaging device 108. Although only one work piece 120 is shown in FIG. 1, the base 130 may be a tray that holds multiple work pieces 120 side by side for concurrent inspection of the work pieces 120. In an alternative embodiment, the imaging device 108 remains stationary in a fixed position throughout the inspection, and the first robotic arm 114 holds and moves the work piece 120 relative to the imaging device 108 to capture the images at one or more positions.

The second robotic arm 116 holds a swab 118. The swab 118 may be an absorbent material in the shape of a pad, clump, cloth, a sponge, or the like, or a brush. The second robotic arm 116 movable relative to the work piece 120 to wipe or brush the work piece 120 with the swab 118 to remove or displace dust, debris, and other contaminants from the surface of the work piece 120. The second robotic arm 116 is operably connected to the control circuit 102 via a wired or wireless communication link, and may be controlled by the control circuit 102. For example, the control circuit 102 may transmit control signals to the second robotic arm 116 via the communication link to control the robotic arm 116 to wipe or brush one or more specific regions of the work piece 120 with the swab 118, as described herein.

The visible light source 110 emits light within the visible band of wavelengths in the electromagnetic spectrum. For example, the visible band of wavelengths may extend from about 400 nm to about 750 nm. As used herein, a wavelength that is "about" a specific value may include wavelengths within a designated range of that specific value, such as within 30 nm of the specific value. The visible light source 110 may provide visible light with a broad band of wavelengths (e.g., white light), or may provide light with a narrow band of wavelengths. The visible light source 110 may have a filter for controlling the waveband of visible light emitted from the light source 110.

The ultraviolet light source 111 emits light within the UV band of wavelengths in the electromagnetic spectrum, which has shorter wavelengths than the visible band. For example, the UV band may extend from about 1 nm to about 400 nm. The UV light source 111 may provide UV light with a narrow band of wavelengths within the UV band or a broad band of wavelengths in the UV band. For example, the UV light source 111 may have a filter (e.g., an exciter filter) that narrows the illuminant waveband to only allow UV radiation through the filter that induces a particular fluorescence. For example, the type of filter or setting of the filter may be selected based on the properties of the fluorescent dye applied to the work piece 120 such that the UV radiation permitted through the filter induces a desired fluorescent response by the dye.

The visible light source 110 and the ultraviolet light source 111 are both operably connected to the control circuit 102 via wired and/or wireless communication links. The control circuit 102 is configured to independently operate the light sources 110, 111 by controlling when each of the light sources 110, 111 is activated (e.g., emitting light) and deactivated (e.g., not emitting light). For example, the control circuit 102 may implement a visible light setting by activating the visible light source 110 and deactivating the UV light source 111. The control circuit 102 may implement a UV light setting by activating the UV light source 111 and deactivating the visible light source 110. Although the light sources 110, 111 are discrete and separate from one another in the illustrated embodiment, the two light sources 110, 111 may share one or more components, such as a common housing, in another embodiment.

The inspection system 100 optionally includes a shroud structure 132 that surrounds the work piece 120 and robotic arms 114, 116. The light sources 110, 111 are mounted on and/or within the shroud structure 132 and emit light into a chamber 133 defined by the shroud structure 132. The shroud structure 132 may shield the inspection process from external light, such as ambient or white light, which may enable better control over the lighting conditions during the inspection process. The shroud structure 132 may be a tent, drapes, rigid walls, or the like.

The input/output (I/O) device 122 of the inspection system 100 includes at least one display device and at least one user input device that allows an operator to interact with the inspection system 100. The I/O device 122 is operably connected to the control circuit 102. The display may be a liquid crystal display (e.g., light emitting diode (LED) backlight), an organic light emitting diode (OLED) display, a plasma display, a CRT display, and/or the like. The user input device may be a touchpad, a touchscreen, a mouse, a keyboard, physical buttons, or the like, that is configured to receive inputs from the operator. For example, the operator may use the display to view the results of the FPI inspection and for selecting additional actions, such as scheduling repair of the work piece 120, admitting the work piece 120 as passing the inspection, or discarding the work piece 120. In an embodiment, the operator may participate in the analysis by viewing the images captured by the imaging device 108 on the display, and by using the user input device to select areas of the images that have potential defects for additional inspection of the work piece 120 in regions corresponding to the selected areas in the images. The I/O device 122 optionally includes additional outputs, such as audio speakers, vibrating devices, or the like, for alerting the operator.

The control circuit 102 may be operably connected to a communication device 112 of the inspection system 100 that includes hardware such as a transceiver, receiver, transmitter, and/or the like, and associated circuitry (e.g., antennas). The communication device 112 may be controlled by the control circuit 102 to wirelessly communicate with one or more of the components of the inspection system 100, such as the imaging device 108, the light sources 110, 111, and/or the robotic arms 114, 116. The communication device 112 in addition or alternatively may wirelessly connect the control circuit 102 to another device, such as a remote server, a mobile device (e.g., held by an operator), or the like.

Optionally, the control circuit 102, the memory 106, the communication device 112, and the I/O device 122 may be components within a common device, such as a computer (e.g., desktop, laptop, tablet, smart phone, mobile work station, etc.). For example, the control circuit 102, the memory 106, the communication device 112, and the I/O device 122 may be commonly surrounded by a housing or case. The communication device 112 and the I/O device 122 may be optional components of the inspection system 100, such that alternative embodiments may lack one or both of the devices 112, 122.

The inspection system 100 according to one or more embodiments automatically performs all, or at least a portion of, a FPI inspection process to detect and evaluate defects on the work piece 120. For example, the work piece 120 on the base 130 has a fluorescent dye applied onto a surface 134 of the work piece 120 that is being inspected (e.g., an inspection surface 134). The work piece 120 may be cleaned prior to the application of the dye. After the dye application, the inspection surface 134 of the work piece 120 is cleaned and dried to remove a majority of the dye from the work piece 120. A developer may be applied to the surface 134 of the work piece 120. The cleaning process does not remove dye that penetrates within discontinuities in the surface 134, such as cracks, nooks, crannies, irregular surface conditions, etc. The discontinuities may represent defects on the work piece 120. After cleaning and drying the surface 134, at least a portion of the dye within such discontinuities may seep (e.g., bleed) out of the discontinuities onto the surrounding area of the surface 134. The FPI inspection process uses UV induced fluorescence of the dye that penetrates discontinuities in the work piece 120 to detect potential defects in the work piece 120. Optionally, the inspection system 100 shown in FIG. 1 is configured to perform the FPI inspection process subsequent to the initial dye application and cleaning stages.

According to one or more embodiments, the control circuit 102 performs the FPI inspection by controlling the imaging device 108 to capture a first set of images of the work piece 120 in a UV light setting and a second set of images of the work piece 120 in a visible light setting. The first and second sets of images are captured by the imaging device 108 at the same one or more positions of the imaging device 108 relative to the work piece 120. For example, for each image in the first set taken at a designated position of the imaging device 108, there is a corresponding image in the second set taken at the same designated position, such that the only difference between the images in the first and second sets are the lighting conditions. The control circuit 102 may analyze the images obtained from the imaging device 108 under the different lighting conditions to detect image data indicative of defects in the work piece 120. The control circuit 102 maps the images to a computer design model of the work piece 120 to calibrate the graphic location of a defect in the images with the physical location of the defect in the actual work piece 120. In addition to determining the physical location of defects, the mapping of the images to the computer design model enables measurement of the physical dimensions (e.g., sizes) of the defects based on the graphic representations of the defects in the image data.

The following paragraphs describe an FPI inspection operation performed by the inspection system 100 according to an embodiment. The control circuit 102 obtains a computer design model of the work piece 120. The computer design model may be a three-dimensional (3D) model that has points (e.g., voxels) representing the work piece 120 in a 3D computer coordinate system. The computer design model may be a scale representation of the work piece 120. For example, the difference in size between the actual work piece 120 and a displayed size of the model on the display of the I/O device 122, for example, may be known, which enables the inspection system 100 to calculate lengths of the actual work piece 120 by measuring corresponding lengths along the model. The computer design model may be a computer-aided design (CAD) model or the like. The control circuit 102 may obtain the computer design model of the work piece 120 from an external source via the communication device 112 or a wired port or drive. The computer design model may be stored, at least temporarily, within the memory 106.

Using the computer design model, the control circuit 102 selects one or more positions of the imaging device 108 at which to capture images of the inspection surface 134 of the work piece 120. For example, the one or more positions are selected to ensure that the entire inspection surface 134 of the work piece 120 is depicted within the images acquired at the selected position(s).

Figure 2:
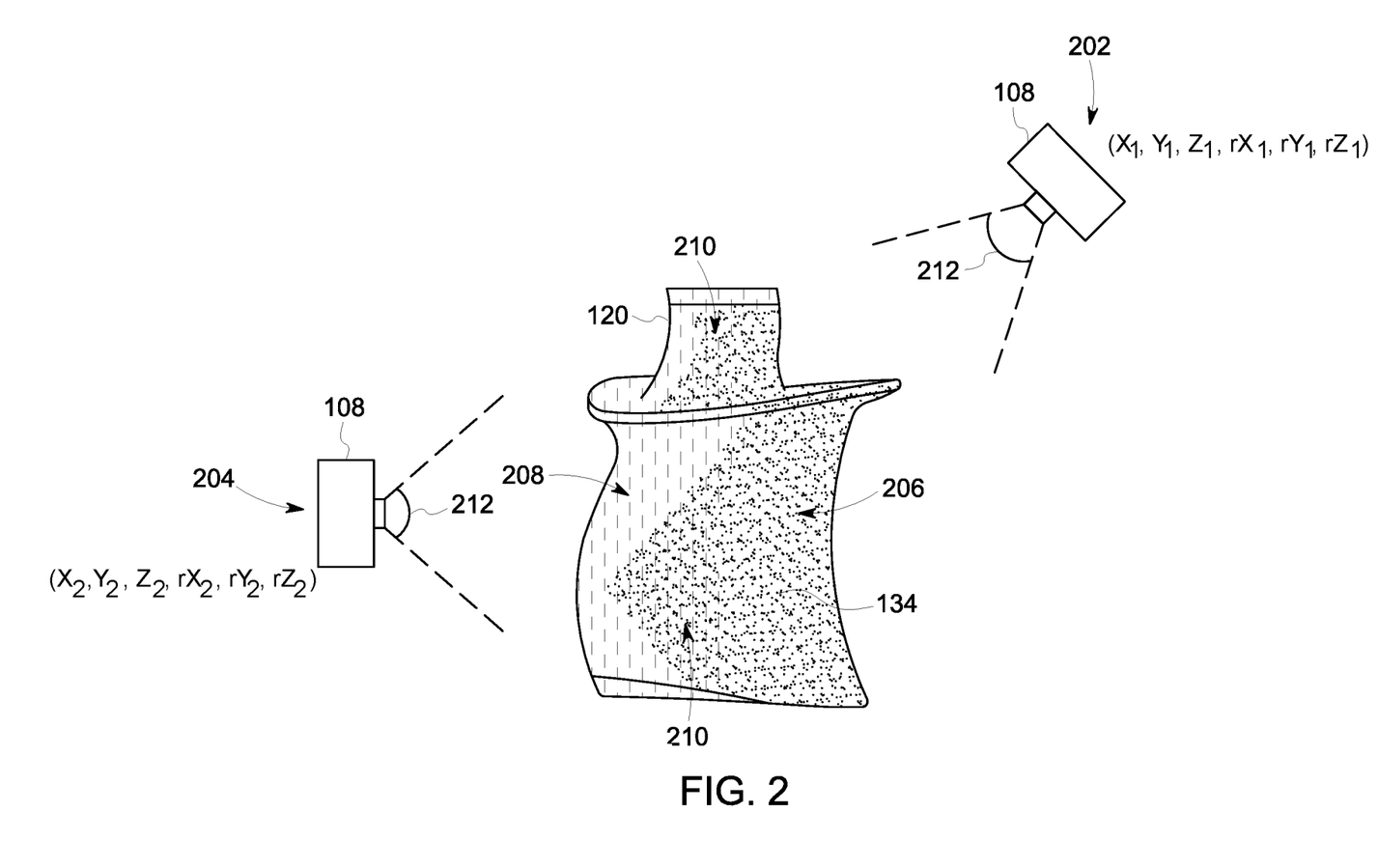
FIG. 2 illustrates a work piece and an imaging device of the inspection system at two different positions relative to the work piece.

Additional reference is now made to FIG. 2, which illustrates the work piece 120 and the imaging device 108 at two different positions relative to the work piece 120. The work piece 120 in FIG. 2 may be a 3D representation of the work piece 120 in the computer design model. The imaging device 108 is shown at a first position 202 and a second position 204 relative to the work piece 120. For example, the first position 202 has location coordinates ($x_1$, $y_1$, $z_1$) and angle coordinates ($rx_1$, $ry_1$, $rz_1$). The two angle coordinates refer to angles in two perpendicular planes. For example, the robotic arm 114 may be configured to tilt and rotate the imaging device 108 in two perpendicular planes to achieve various angles. The second position 204 has location coordinates ($x_2$, $y_2$, $z_2$) and angle coordinates ($rx_2$, $ry_2$, $rz_2$). Both the location and the angle of the second position 204 differ from the location and the angle of the first position 202.

The control circuit 102 may select the first and second positions 202, 204 as the designated positions at which the imaging device 108 will acquire images of the work piece 120 during the FPI inspection process. The total number of positions 202, 204, as well as the locations and angles thereof, may be calculated by the control circuit 102 based on factors such as the field of view of the imaging device 108, the size of inspection surface 134 of the work piece 120, the complexity of the inspection surface 134 (e.g., surface topology), and the like. The control circuit 102 may utilize the computer design model of the work piece 120 to determine measurements and features of the work piece 120 that are factored into the calculation.

The position selection calculation may also depend on constraints, such as a maximum permitted relative angle from the normal axis from the surface 134 of the work piece 120 to the imaging device 108. For example, an acceptable range of angles from the normal axis may be within 45 degrees, within 30 degrees, within 20 degrees, or within 10 degrees from the normal axis. This angular constraint may be implemented such that the imaging device 108 is relatively orthogonal to the inspection surface 134 to ensure that the imaging device 108 receives a sufficient amount of light reflected or radiated from the inspection surface 134. Another constraint may dictate that the entire inspection surface 134 of the work piece 120 is captured in the image data acquired at the one or more selected positions, which ensures that the entire surface 134 is inspected for defects.

The control circuit 102 may solve an optimization problem to select one or more positions from a large set of potential positions as on output or result of the optimization problem based on the known characteristics of the work piece 120 and the imaging device 108 and the designated constraints. For example, the control circuit 102 may utilize the known information to simulate the regions or areas of the work piece 120 that would be captured in image data by the imaging device 108 at each of the potential positions. For example, FIG. 2 shows a coverage area 206 (represented by dot shading in FIG. 2) that would be captured by the imaging device 108 at the first position 202 with a set field of view 212 of the imaging device 108. FIG. 2 also shows a different coverage area 208 (represented by dash shading in FIG. 2) that would be captured by the imaging device 108 at the second position 204 with the same field of view 212. The coverage area 206 is generally along the right half of the work piece 120 in FIG. 2, and the coverage area 208 is generally along the left half of the work piece 120. There are overlapping areas 210 in which the coverage areas 206, 208 overlap, indicating that these portions of the work piece 120 would be captured in an image acquired at each of the two positions 202, 204. As shown in FIG. 2, the combination of the two coverage areas 206, 208 covers the entire inspection surface 134 of the work piece 120.

Although two positions are selected for the FPI inspection in the illustrated embodiment, in other embodiments the control circuit 102 may select only one position or more than two positions. For example, if the imaging device 108 is able to capture the entire inspection surface 134 of the work piece 120 from a single position and satisfies all designated constraints, then the control circuit 102 may select a single position instead of multiple positions.

After selecting the one or more positions, the control circuit 102 begins an image acquisition stage. The control circuit 102 controls the robotic arm 114 to move the imaging device 108 to a first of the two selected positions 202, 204. For example, the robotic arm 114 may move the imaging device 108 to the first position 202, which is also referred to as a canonical position 202. At the canonical position 202, the imaging device 108 is controlled to acquire an image of the work piece 120 in a visible light setting. For example, the control circuit 102 may establish the visible light setting by activating the visible light source 110 and deactivating the UV light source 111 (or maintaining the UV light source 111 in a deactivated state, if applicable). As a result, the work piece 120 within the chamber 133 of the shroud structure 132 is illuminated by light having a visible band of wavelengths.

Without moving the imaging device 108 from the canonical position 202, the imaging device 108 is controlled to acquire another image of the work piece 120, but this time in a UV light setting. The control circuit 102 may establish the UV light setting by deactivating the visible light source 110 and activating the UV light source 111. As a result, the work piece 120 within the chamber 133 is illuminated by UV light (having one or more wavelengths within the UV band). In the UV light setting, the chamber 133 may be dim from the perspective of an operator due to the lack of visible light within the chamber 133. Although the visible light image is described above as being captured prior to capturing the UV image, it is recognized that the order may be reversed such that the UV image is acquired before the visible light image.

Figure 3:
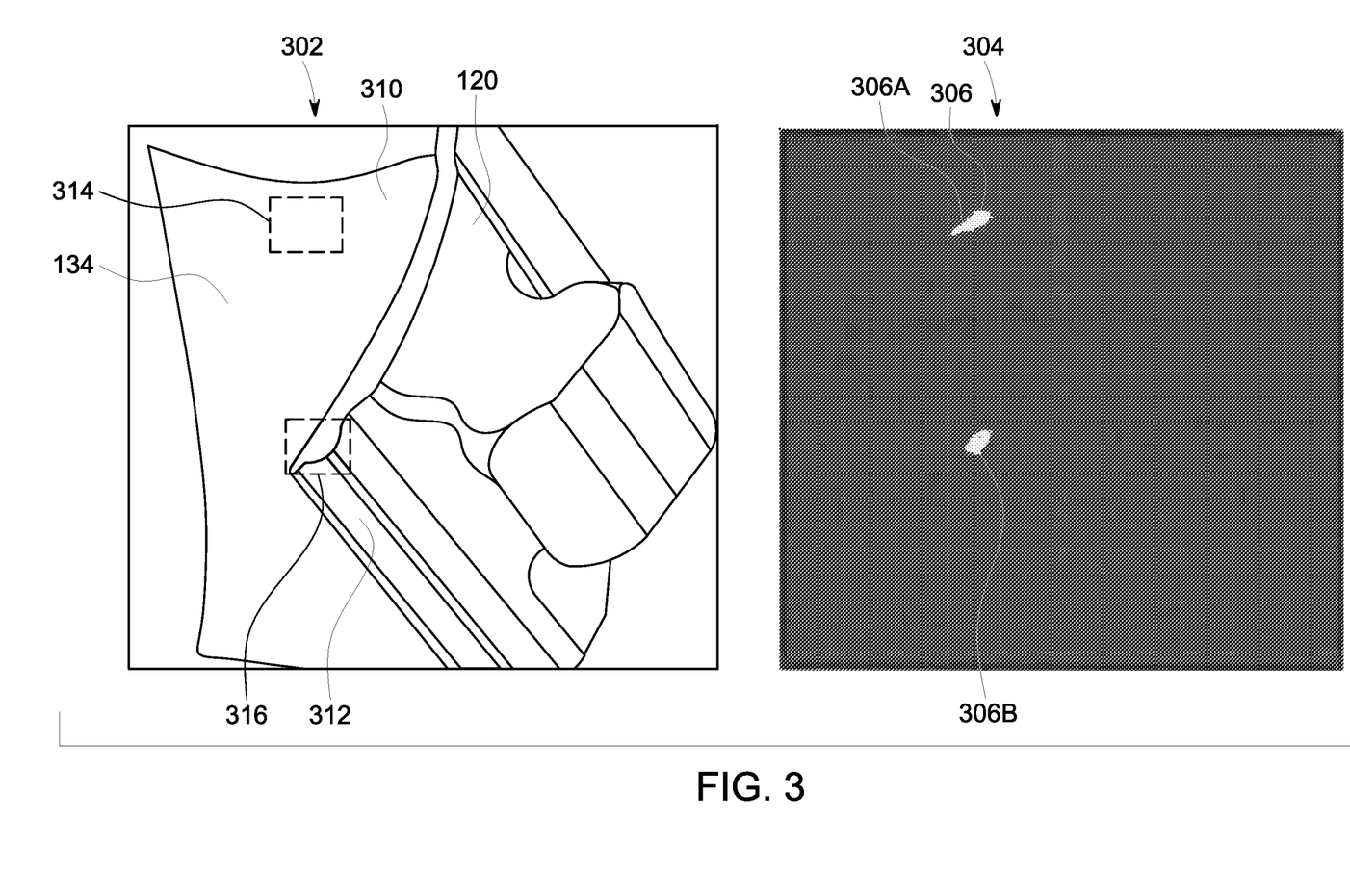
FIG. 3 shows a first image of the work piece generated using a visible light setting and a second image of the work piece generated using a UV light setting.

Reference is now made to FIG. 3, which shows a first image 302 of the work piece 120 acquired in the visible light setting and a second image 304 of the work piece 120 acquired in the UV light setting. Although the two images 302, 304 are acquired under different lighting conditions or modalities, the imaging device 108 captures both images 302, 304 from the same position relative to the work piece 120 (e.g., the canonical position 202 shown in FIG. 2). As a result, both of the images 302, 304 depict the same subject matter (e.g., the coverage area 206 of the work piece 120 shown in FIG. 2).

Optionally, the control circuit 102 may perform an initial analysis on the two images 302, 304 acquired at the canonical position 202 to ensure that various pre-conditions are satisfied before advancing with the FPI inspection process. For example, one pre-condition may involve measuring the average intensity of light in the UV image 304. The light in the UV image 304 represents UV-induced radiation from the dye on the work piece 120. The average intensity may be an average intensity of each of the pixels in the UV image 304. If the average intensity of the light in the UV image 304 exceeds a designated threshold, then there is an excessive amount of residue (e.g., fluorescent dye, dust, debris, contaminants, etc.) on the work piece 120. For example, if a significant amount of the inspection surface 134 radiates or reflects light that is captured by the imaging device 108 in the UV image 304, then it is difficult to distinguish actual defects from false positives, such as residual dye (unassociated with bleed back from a defect), dust, dirt, and other contaminants. In response, the work piece 120 is set aside for additional cleaning to remove the excess residue prior to restarting the image acquisition stage. If the average light intensity in the UV image 304 is at or below the designated threshold, then the pre-condition is considered satisfied.

Another pre-condition checks the alignment of the work piece 120 relative to the system 100. More specifically, the control circuit 102 may analyze the visible light image 302 to compare the alignment of the work piece 120 in the visible light image 302 with a reference pose. The reference pose may be stored in the memory 106 or another storage device accessible to the control circuit 102. The control circuit 102 may perform a simple image analysis, such as edge detection, to determine a perimeter outline of the work piece 120 depicted in the visible light image 302. If the perimeter outline in the image 302 aligns with the reference pose within a designated margin of error, then the pre-condition is considered satisfied. On the other hand, if the perimeter outline does not align with the reference pose, then the work piece 120 may need to be realigned on the base 130. The misalignment of the work piece 120 to the reference pose may also indicate if the work piece 120 is a different size or type of work piece 120 than is expected by the control circuit 102. For example, the control circuit 102 may be expecting to perform FPI inspection on a blade, but the actual work piece 120 on the base 130 is a nozzle. This alignment check can be used to correct the error before continuing with the FPI inspection.

In the FPI inspection process according to an embodiment, the control circuit 102 is configured to map the visible light image 302 to the computer design model of the work piece 120. The control circuit 102 may utilize an image analysis technique, such as feature matching, edge detection, boundary analysis, edge registration, edge fitting, or the like, to determine which parts of the computer design model of the work piece 120 are depicted in the subject matter of the image 302. In a non-limiting example, the control circuit 102 may perform feature matching to map the visible light image 302 to the computer design model. In the feature matching analysis, the control circuit 102 may identify a set of designated features that are depicted in the image 302, such as a corner of the blade, an end of the blade, a corner of a flange, etc., and determines coordinates and/or dimensions of each of the designated features within the frame of the image 302. For example, the coordinates and dimensions of the designated features in the image 302 may be based on the number and locations of pixels that represent the designated features. The control circuit 102 locates corresponding features in the computer design model that represent the set of designated features from the image 302, and determines coordinates and/or dimensions of each of the corresponding features within the 3D coordinate system of the computer design model. The control circuit 102 then groups the information about each of the designated features in the image 302 with the associated information from the features in the computer design model to generate data pairs. For example, a specific corner of the blade of the work piece 120 may be depicted in the image 302 by ten pixels, each having known 2D coordinates in the image 302. The same corner of the blade may be represented by six voxels having known 3D coordinates in the computer design model, so a data pair for the corner of the blade is generated with the image data and the model data.

The control circuit 102 may generate a transfer function that converts the coordinates and sizes of the features in the image 302 to the coordinates and sizes of the corresponding features in the computer design model. For example, the transfer function may reduce the offset between the image data and the model data in each of the data pairs representing a designated feature of the work piece 120. The control circuit 102 may apply the transfer function to points or regions of the visible light image 302 to determine the corresponding points or regions in the computer design model. The transfer function may also be used to determine dimensions (e.g., lengths, sizes, etc.) of defects identified in the image data by converting dimension of defects depicted in the image 302 to the computer design model, which is a scale representation of the actual work piece 120.

It is recognized that mapping the visible light image 302 to the computer design model constructively maps the UV image 304 to the computer design model as well because both of the images 302, 304 depict the same subject matter in the same perspective and frame of reference. For example, the control circuit 102 can utilize the transfer function that is generated based on the visible light image 302 to determine where fluorescent discontinuity locations 306 shown in the UV image 304 are located in the computer design model of the work piece 120. Because the computer design model is a scale representation of the actual work piece 120, the control circuit 102 can determine where the discontinuity locations 306 depicted in the UV image 304 are located on the actual work piece 120.

Mapping the UV image 304 to the computer design model also may enable the pixel intensity of the UV image 304 to be normalized. For example, knowing the depth and 3D model geometries, the control circuit 102 may normalize the UV light intensity to generate a uniform intensity over the total area of the UV image 304. The intensity of the pixels in the visible light image 302 may also be normalized over the total area of the visible light image 302 based on the computer design model.

After acquiring the two images 302, 304 under the two different lighting conditions at the canonical position 202, the control circuit 102 controls the robotic arm 114 to move the imaging device 108 to the second selected position 204 (shown in FIG. 2) relative to the work piece 120. The control circuit 102 repeats the image analysis stage with the imaging device 108 in the second position 204. For example, the control circuit 102 controls the light sources 110, 111 to provide the visible light setting in which the imaging device 108 captures an image from the second position 204, and separately controls the light sources 110, 111 to provide the UV light setting in which the imaging device 108 captures another image from the same position 204. In an embodiment, for every position that is selected by the control circuit 102, the imaging device 108 captures both a visible light image (e.g., an image acquired in the visible light setting) and a UV image (e.g., an image acquired in the UV light setting) in that position.

The control circuit 102 maps the visible light image acquired by the imaging device 108 in the second position 204 (e.g., the second visible light image) to the computer design model. In an embodiment, the control circuit 102 may map the second visible light image without performing addition image analysis, such as feature matching, on the second visible light image. For example, the control circuit 102 knows the positional offset between the canonical position 202 of the imaging device 108 and the second position 204. Based on the known movement of the robotic arm 114 from the canonical position 202 to the second position 204, the control circuit 102 can calculate the image frame or field of view of the second visible light image relative to the image frame of the first visible light image 302. The previously-generated transfer function aligns the image data from the first visible light image 302 to the computer design model. By utilizing both the transfer function and the known positional offset between the two positions 202, 204 of the imaging device 108, the control circuit 102 may be configured to map the second visible light image to the computer design model (without performing additional image analysis). In an alternative embodiment, the control circuit 102 does perform image analysis on the second visible light image captured at the second position 204 to generate a second transfer function for mapping the second visible light image to the computer design model independent of the mapping of the first visible light image 302.

Upon mapping the second visible light image, some portions of the work piece 120 depicted in the second visible light image may overlap with portions of the work piece 120 depicted in the (first) visible light image 302. For example, the overlapping portions of the images may correspond to the overlapping areas 210 of the work piece 120 shown in FIG. 2. Identifying overlapping portions of the images is useful for detecting the correct amount of defects. For example, if there is a defect along the inspection surface 134 of the work piece 120 within an overlapping area 210 of the work piece 120, one defect may be depicted in the images from each of the two positions 202, 204 of the imaging device 108. Identifying the overlapping portions of the images and mapping the images to the computer design model ensures that such a defect is not interpreted as two different defects.

After acquiring images of the work piece 120 in both UV and visible light settings from each of the one or more selected positions of the imaging device 108 relative to the work piece 120, the images are analyzed to detect discontinuities that may represent defects. In one or more embodiments, this analysis is automatically performed via the control circuit 102 or one or more other processors. The UV light images, such as the UV image 304 shown in FIG. 3, may be processed to identify discontinuity locations 306 in the image data.

The discontinuity locations 306 may be identified based on light characteristics relative to a designated threshold or relative to other pixels in the images. The light characteristics that are measured may include intensity, wavelength, or the like. As shown in the UV image 304, there are two small areas that have a bright intensity, while the remainder of the UV image 304 is dark. The two areas are identified as discontinuity locations 306 because the fluorescent intensity of light within the two areas exceeds a designated threshold intensity level. The designated threshold intensity level may be an absolute value, or may be relative to the intensity of surrounding pixels or an average intensity of all pixels in the image 304. The discontinuity locations 306 in the UV image 304 represent areas in which a substance or material on the work piece 120 is emitting radiation responsive to the UV light from the UV light source 111. For example, the discontinuity locations 306 may be attributable to fluorescent dye on the work piece 120 that fluoresces in the presence of the UV light. The dye may have bled or seeped out of a defect in the work piece 120, such as a crack, a spalling or flaking area, a chip, or the like, after the cleaning stage such that the presence of the dye may indicate a defect in the inspection surface 134 of the work piece 120.

The identification of discontinuity locations 306 in the UV image 304 does not ensure the presence of defects in the work piece 120 because the discontinuity locations 306 may be attributable to other materials and/or substances that do not indicate a defect. For example, the discontinuity locations 306 may be caused by the reflection or fluorescence of dust, dirt, powder, or other foreign debris and contaminants on the inspection surface 134 of the work piece 120, other than the fluorescent dye. In another example, the discontinuity locations 306 may be caused by fluorescent dye along a coarse (but non-defect) area of the inspection surface 134 that was inadequately cleaned prior to the image acquisition stages. Therefore, the discontinuity locations 306 may indicate defects or false positives (e.g., foreign debris, residual dye along non-defect areas of the surface 134, etc.).

In addition to analyzing the UV images acquired in the UV light setting from the one or more positions of the imaging device 108, the visible light images acquired in the visible light setting may also be analyzed. For example, although it may be easier to see small defects, such as cracks, by analyzing the UV images, the visible light images may show large defects, such as large cracks, large spalling or flaking areas, and the like. The visible light images may actually show such large defects better than the UV light images because the cleaning stage may remove all or most of the fluorescent dye from within the large defects. The analysis of the visible light images may also be used in conjunction with the UV images to disqualify false positives. For example, upon identifying the discontinuity locations 306 in the UV images, the control circuit 102 may analyze the same regions in the visible light images to determine if the discontinuity location 306 could be disqualified as part of the background, a complex topology region of the work piece 120 that is free of defects, or the like.

In FIG. 3, the UV image 304 is determined to have two discontinuity locations 306. Analysis of the visible light image 302 (acquired from the same position of the imaging device 108) indicates that a first discontinuity location 306A is located in a region 314 along a face of a blade 310 of the work piece 120 and a second discontinuity location 306B is located in a region 316 along an edge of a flange 312 of the work piece 120. Based on the locations of the discontinuity locations 306A, 306B relative to the work piece 120, the control circuit 102 may not be able to discount either discontinuity location 306A, 306B as a false positive at this time in the FPI inspection process. In the illustrated embodiment, the two discontinuity locations 306A, 306B are identified as the output or result of the image analysis.

The image analysis to identify one or more discontinuity locations 306 may be performed by the control circuit 102 or other automated processing circuitry. Although the discontinuity locations 306 in the description above may be identified based on light characteristics (such as intensity or wavelength) according to programmed instructions, in an alternative embodiment the images may be analyzed within a deep learning module, such as an artificial neural network, that is trained to identify discontinuity locations 306. The artificial neural network may be stored within the memory 106 or may be stored remote from the memory 106 and the control circuit 102. For example, the communication device 112 may communicate the images to the artificial neural network on a remote device, and the communication device 112 may receive a result message from the remote device that identifies any discontinuity locations detected by the neural network.

In an alternative embodiment, the FPI inspection process may be semi-automated such that the inspection system 100 utilizes operator input during the image analysis stage described above. For example, the control circuit 100 may display the UV images and the visible light images to the operator on the display of the I/O device 122. The operator may review the displayed images and utilize an input device of the I/O device 122, such as a touchscreen, touchpad, mouse, of keyboard, to manually select the discontinuity locations 306. For example, if the operator views the UV image 304 shown in FIG. 3, the operator may see the two bright spots and highlight those spots as discontinuity locations 306. The operator may also be able to view the visible light image 302 and highlight areas on the visible light image 302 as discontinuity locations 306. For example, the visible light image 302 may show relatively large defects on the work piece 120 that are viewable without the aid of a fluorescent penetrant dye. The user selections are communicated as user input messages to the control circuit 102 which documents the user selections in the memory 106.

After the automated or semi-automated identification of at least one discontinuity location 306, the control circuit 102 controls the second robotic arm 116 (shown in FIG. 1) to physically wipe the work piece 120 with the swab 118 in the specific areas of the work piece 120 that correspond to the discontinuity locations 306 in the image data. For example, in the illustrated embodiment shown in FIG. 3, the control circuit 102 controls the robotic arm 116 to wipe the blade 310 in the region 314 depicted in the visible light image 302 and to wipe the edge of the flange 312 in the region 316. The wiping removes residual dye and external debris and contaminants, such as dust, dirt, debris, and the like from the work piece 120. As used herein, the term "wipe" and variations thereof refer broadly to physically abutting and sliding one object (e.g., a towel or brush) against the surface of another object (e.g., a work piece), and includes actions such as brushing, sponging, rubbing, swabbing, polishing, and the like. In an embodiment, the robotic arm 116 is controlled to only wipe the areas of the work piece 120 corresponding to the identified discontinuity locations 306, and does not wipe the entire inspection surface 134, unlike the cleaning stage during which the work piece 120 is prepared for image acquisition. The control circuit 102 is able to move the robotic arm 116 to specific areas of the work piece 120 that correspond to the discontinuity locations 306 in the image data because the image data is mapped to the computer design model, which is effectively mapped to the actual work piece 120.

After wiping the work piece 120, the control circuit 102 is configured to wait for a designated period of time to allow any remaining fluorescent dye within defects of the work piece 120 to bleed out of the defects onto the surrounding edges of the defects along the inspection surface 134. The designated period of time may be on the order of seconds or minutes. The control circuit 102 subsequently controls the first robotic arm 114, the imaging device 108, and the light sources 110, 111 (shown in FIG. 1) to repeat the image acquisition stage. For example, the robotic arm 114 moves the imaging device 108 to the canonical position 202 (shown in FIG. 2), at which the imaging device 108 acquires another image in the visible light setting and another image in the UV light setting. The robotic arm 114 also moves the imaging device 108 to the second position 204 and any additional selected positions to acquire both a visible light image and a UV light image at each position. For example, the only difference or variable between the first image acquisition stage and the second image acquisition stage may be the condition of the work piece 120, because the work piece 120 is wiped by the second robotic arm 116 between the first image acquisition stage and the second image acquisition stage. The images acquired during the first image acquisition stage may be referred to as pre-wipe images, and the images acquired during the second image acquisition stage may be referred to as post-wipe images. The imaging device 108 may be controlled to acquire the same number of post-wipe images as the number of pre-wipe images.

The pre-wipe and post-wipe images may be stored in the memory 106. The control circuit 102 may group or classify the pre-wipe images with corresponding post-wipe images in pairs. For example, the image captured from the canonical position 202 in the visible light setting prior to the wiping stage may be grouped with the image captured from the canonical position 202 in the visible light setting after the wiping stage.

Each pair of images is analyzed to check for discrepancies between the two images in the pair. If image data in the post-wipe image matches a discontinuity location in the pre-wipe image, the discontinuity location is classified as a defect. The image data in the post-wipe image may match a discontinuity location in the pre-wipe image if the location, size, and/or light characteristics (e.g., intensity, wavelength, etc.) of the image data are within a designated margin of error of the discontinuity location. The discontinuity is classified as a defect because the discontinuity remains after the second robotic arm 116 wipes the work piece 120 in that region. For example, the discontinuity can be ruled out as a false positive attributable to excess dye on the surface 134 of the work piece 120 or debris because such materials would have been removed by the swab 118 of the robotic arm 116. For example, the pre-wipe UV image 304 shown in FIG. 3 is compared to a corresponding post-wipe image acquired in the UV light setting from the canonical position 202. If the post-wipe image contains a bright spot that sufficiently matches the first discontinuity location 306A (within the threshold margin of error), then the first discontinuity location 306A is classified as a defect.

If the comparison of the image pair indicates that the post-wipe image fails to include image data that matches an identified discontinuity location in the pre-wipe image, then the discontinuity location is classified as a false positive. For example, if the post-wipe image that is compared to the pre-wipe UV image 304 fails to show a bright spot in the area corresponding to the second discontinuity location 306B, then the second discontinuity location 306B is classified as a false positive, instead of a defect. The discontinuity location 306B may have been attributable to foreign debris (e.g., dirt, dust, powder, or other substances) or excess dye along a non-defect area of the surface 134, which was removed when the second robotic arm 116 wiped the work piece 120 with the swab 118. In the hypothetical situation described above, the analysis between the pre-wipe images and the post-wipe images may result in the determination that the inspection surface 134 of the work piece 120 includes a single defect. The defect is located at the first discontinuity location 306A shown in the UV image 304. The defect may represent a crack, spalling or flaking, a chip, or other abrasion along the surface 134.

For each discontinuity location 306 in the image data that is classified as a defect, the control circuit 102 is configured to calculate the physical location of the defect within the actual work piece 120. For example, the control circuit 102 may utilize the transfer function that is generated when mapping the images to the computer design model to convert the classified defect in the image frame to a location on the computer design model, which is a scale representation of the actual work piece 120. The control circuit 102 may output coordinates representing the location of the defect within the computer design model coordinate system. In addition to determining the location of one or more defects on the work piece 120, the control circuit 102 may also calculate the dimensions (e.g., sizes) of the defects by applying the transfer function to measured dimensions of the defects in the image data. For example, the control circuit 102 may be able to measure the actual lengths of detected cracks in the work piece 120 based on the image data and the mapping of the images to the computer design model.

After determining the location and sizes of the defects in the work piece 120 within the coordinate system of the computer design model, the control circuit 102 optionally may construct a 3D feature map on the computer design model that shows the defects. For example, the feature map may be viewable on a display device with the defects superimposed onto the computer design model. The feature map may be utilized by an operator for determining whether to pass the work piece 120, repair the work piece 120, discard the work piece 120, or the like, without viewing the actual work piece 120.

The image analysis to compare the pre-wipe images with the post-wipe images for determining the presence of defects may be automated and performed by the control circuit 102 or other processing circuitry. For example, the control circuit 102 may compare the pre-wipe images to the corresponding post-wipe images according to programmed instructions. Alternatively, the pre-wipe and post-wipe images may be analyzed within a deep learning module, such as an artificial neural network, that is trained to differentiate between defects and false positives based on the images.

In an alternative embodiment, the comparison stage to differentiate defects from false positives in the image data may be semi-automated such that an operator provides input. For example, the control circuit 100 may display each pair of pre-wipe and post-wipe images to the operator on the display of the I/O device 122. The operator can look for discrepancies between the identified discontinuity locations 306 in the pre-wipe images and the corresponding locations in the post-wipe images, and can utilize an input device of the I/O device 122 to label each of the identified discontinuity locations 306 as either a defect (e.g., if the discontinuity is consistent between the two images) or a false positive (e.g., if the discontinuity is not consistent between the two images). The user selections are communicated as user input messages to the control circuit 102 which documents the user selections in the memory 106.

In at least one embodiment described herein, the inspection system 100 may perform a fully automated FPI inspection process, such that computer processors analyze the images to both identify discontinuity locations in the pre-wipe images and to subsequently classify the discontinuity locations as defects or false positives, without depending on operator input. The fully automated process has several advantages over the conventional fully manual FPI process, such as increased objectivity, consistency, reliability, repeatability, efficiency, accuracy, and the like. For example, the analysis is performed based on programmed instructions and/or trained artificial neural networks, which are not susceptible to human subjectivity and less prone to error.

In one or more other embodiments, the inspection system 100 may perform a semi-automated FPI inspection process that utilizes operator input for (i) identifying discontinuity locations in the pre-wipe images only; (ii) classifying discontinuity locations as defects or false positives only; or (iii) both identifying discontinuity locations and later classifying the discontinuity locations as defects or false positives. Even though some of the analysis is performed by a human operator, the semi-automated FPI process performed by the inspection system 100 still has several advantages over the conventional fully manual FPI process. For example, the operator may prefer to perform FPI inspections using the inspection system 100 disclosed herein because the operator does not need to manually manipulate the work piece 120. For example, the operator may be remote from the shroud structure 132 entirely, and may perform the analysis to identify discontinuity locations and/or classify defects from the comfort of an office using a computer. The operator can avoid direct exposure fluorescent dye and prolonged periods within a dark UV-lit tent or room.

Another advantage of both the fully automated and semi-automated embodiments of the FPI inspection process performed by the inspection system 100 is the automatic recordation and documentation of data throughout the process. For example, the control circuit 102 may be configured to record various information about the inspection of each work piece 120. The information may be stored in the memory 106 and/or communicated to remote storage, such as a cloud computing server. The control circuit 102 may generate a report that includes the information in a reproducible format. The information that is recorded may include (i) an identity of the work piece 120, (ii) lighting settings (e.g., the intensity, wavelengths, and the like of both the visible light and the UV light), (iii) settings of the imaging device 108, (iv) the selected positions of the imaging device 108; (v) all of the images captured by the imaging device 108, (vi) the image data identified as discontinuity locations 306, (vi) the subset of the image data classified as defects, (vii) characteristics of the defects (e.g., location and size), (viii) the type of fluorescent dye used, (ix) the regions of the work piece 120 along which the robotic arm 116 wiped, (x) the amount of time permitted after the wiping for the dye to bleed back before acquiring the post-wipe images, and the like. By recording this information, the data from many FPI inspections may be aggregated and studied to improve the FPI inspection process by making the FPI inspection process more objective, consistent, and accurate than the conventional manual process.

Depending on the number, size, and type of defects detected, the work piece 120 may be classified as passing the inspection, scheduled for repair, or discarded (e.g., scrapped). In an embodiment, if the work piece 120 has no detected defects, then the control circuit 102 identifies the work piece 120 as passing the inspection. If the work piece 120 has one or more detected defects, the control circuit 102 may take several responsive actions. For example, the control circuit 102 may generate a command signal or message to automatically schedule the work piece 120 for repair or additional inspection by an operator. Similarly, the control circuit 102 may generate a signal to notify an operator of the detected presence of defects in the work piece 120, such as via a text-based message, an audio message, or the like. The result of the inspection (e.g., passing, repair, discard, etc.) may be stored in the report with the other information. The inspection system 100 disclosed herein may beneficially reduce the overall rate at which work pieces are discarded during the FPI inspection process. For example, recording details about the inspection process for subsequent analysis enables the decision-making of the operator to be reviewed, which ensures accountability on the part of the operator.

Figure 4:
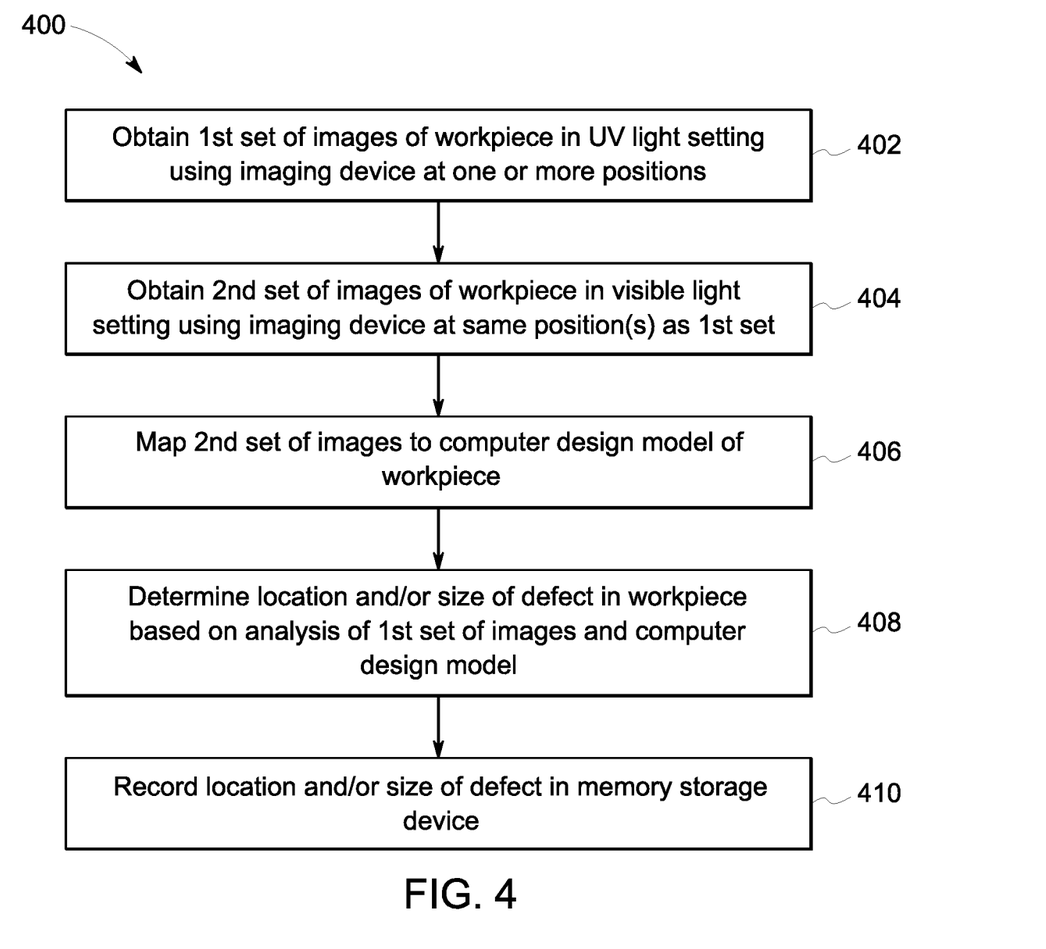
FIG. 4 is a flowchart of a method for performing FPI inspection of a work piece according to an embodiment.

FIG. 4 is a flowchart of a method 400 for performing FPI inspection of a work piece according to an embodiment. The method 400 may represent at least some of the operations performed by the control circuit 102, including the one or more processors 104 thereof, of the inspection system 100 shown in FIG. 1. The method 400 may represent an algorithm used to create (e.g., write) one or more software applications that direct operation of one or more processors 104 of the control circuit 102.

Referring to FIGS. 1 through 3, the method 400 begins at 402, at which a first set of images of a work piece 120 is obtained in an ultraviolet light setting. The work piece 120 has a fluorescent dye thereon, although a majority of the dye may be cleansed from the work piece 120 prior to the capturing of the images. The first set of images is acquired via an imaging device 108 at one or more selected positions relative to the work piece 120. The ultraviolet light setting may be provided by activating a UV light source 111 and deactivating a visible light source 110 (or maintaining the visible light source 110 in a deactivated state). The first set of images includes a first UV image acquired by the imaging device 108 at a first or canonical position 202 relative to the work piece 120, and a second UV image acquired by the imaging device 108 at a second position 204 that has a different location and/or angle as the canonical position 202.

At 404, a second set of images of the work piece 120 is obtained in a visible light setting. The visible light setting may be provided by deactivating the UV light source 111 and activating the visible light source 110. The second set of images is acquired by the imaging device 108 at the same one or more positions relative to the work piece as the first set. For example, the second set includes a first visible light image acquired at the canonical position 202 and a second visible light image acquired at the second position 204. Therefore, the first UV image may differ from the first visible light image only in the lighting conditions.

At 406, the second set of images acquired in the visible light setting is mapped to a computer design model of the work piece 120. The computer design model may be a scale representation of the actual work piece 120 (e.g., a 1:8 scale, 1:16 scale, or the like). Optionally, the images are mapped to the computer design model by performing image analysis via one or more processors to match features depicted in the images with corresponding features in the computer design model. The mapping may include generating a transfer function or the like.

At 408, the location and/or size of a defect in the work piece 120 are determined based on an analysis of the first set of images acquired in the visible light setting and the computer design model. For example, the UV images may be analyzed via one or more processors to measure a fluorescent intensity of light within areas (e.g., pixels) of the UV images. If the fluorescent intensity of light within a given area exceeds a designated threshold intensity level, that area of the image may be identified as a discontinuity location 306, which represents a potential defect in the work piece 120. Because the image data is mapped to the computer design model (which is a scale representation of the actual work piece 120), the computer design model may be used to measure the locations of the defects and the sizes (e.g., dimensions) of the defects in a 3D coordinate system.

At 410, information about the defect, such as the location and/or size of the defect, is recorded in a memory storage device 106. Various information about the inspection process may be recorded as a report in a database to document the inspection process. The reports of a multitude of FPI inspections over time may be studied to increase the objectivity, consistency, and accuracy of the FPI inspection process relative to the conventional manual process.

After step 408 and/or step 410, the method 400 may include performing a bleed back operation by wiping or brushing the areas of the work piece 120 depicted in the discontinuity locations 306 of the image data. After the bleed back operation, the work piece 120 may be redeveloped by reapplying a developer on the work piece 120. The developer may be applied to an area of the surface 134 that did not bleed back. Afterwards, flow may return to 402 and additional sets of images (e.g., post-wipe sets of images) may be obtained in the UV and visible light settings. The post-wipe sets of images may be compared to the pre-wipe sets of images to determine if the potential defects are indeed defects or merely false positives based on variations between the post-wipe sets of images and the pre-wipe sets of images attributable to the wiping or brushing during the bleed back operation.

In an embodiment, an inspection system includes an imaging device, a visible light source, an ultraviolet light source, and one or more processors. The one or more processors are operably connected to the imaging device and the visible and ultraviolet light sources. The one or more processors are configured to control the imaging device to generate a first set of images of a work piece that has a fluorescent dye thereon using an ultraviolet light setting in which the ultraviolet light source is activated to illuminate the work piece with an ultraviolet light to cause the fluorescent dye to emit light. The imaging device generates the first set of images at one or more predetermined positions relative to the work piece to monitor the light emitted by the fluorescent dye. The one or more processors are configured to control the imaging device to generate a second set of images of the work piece using a visible light setting in which the visible light source is activated to illuminate the work piece with a visible light. The imaging device generates the second set of images at the same one or more predetermined positions relative to the work piece by monitoring the visible light reflected off the work piece. The one or more processors are configured to map the second set of images to a computer design model of the work piece based on features depicted in the second set of images and the one or more predetermined positions of the imaging device. The one or more processors determine a location of a defect on the work piece based on an analysis of the first set of images and the computer design model.

Optionally, the inspection system also includes a memory storage device, and the one or more processors are configured to record the location of the defect on the work piece in the memory storage device.

Optionally, the one or more processors are configured to determine a size of the defect on the work piece based on the analysis of the first set of images and the computer design model.

Optionally, the one or more processors are configured to control the activation and deactivation of each of the visible light source and the ultraviolet light source to provide the ultraviolet light setting and the visible light setting.

Optionally, the one or more processors are configured to analyze the first set of images to identify the defect in first set of images by measuring a fluorescent intensity of light within one or more images of the first set that exceeds a designated threshold intensity level.

Optionally, the inspection system also includes a robotic arm, and, responsive to receiving an identification of one or more discontinuity locations within at least one of the images in the first set, the one or more processors are configured to control the robotic arm to wipe the work piece with a swab along one or more regions of the work piece corresponding to the one or more discontinuity locations.

Optionally, the first set of the images generated using the ultraviolet light setting includes a pre-wipe image and a post-wipe image. The one or more processors control the imaging device to generate the pre-wipe image at a first position of the imaging device prior to the robotic arm wiping the work piece and control the imaging device to generate the post-wipe image at the first position after the work piece is wiped by the robotic arm. The one or more processors determine the location of the defect on the work piece by comparing the post-wipe image to the pre-wipe image.

Optionally, the inspection system also includes a robotic arm on which the imaging device is mounted. The one or more processors control the robotic arm to move the imaging device relative to the work piece between a first position and a second position that has at least one of a different location or a different angle than the first position. At each of the first and second positions, the one or more processors control the imaging device to generate at least one image of the work piece using the ultraviolet light setting and at least one image of the work piece using the visible light setting.

In an embodiment, a method includes obtaining a first set of images of a work piece that has a fluorescent dye thereon using an ultraviolet light setting in which the work piece is illuminated with an ultraviolet light to cause the fluorescent dye to emit light. The first set is generated by an imaging device at one or more predetermined positions relative to the work piece to monitor the light emitted by the fluorescent dye. The method also includes obtaining a second set of images of the work piece using a visible light setting in which the work piece is illuminated by a visible light. The second set is generated by the imaging device at the same one or more predetermined positions relative to the work piece by monitoring the visible light reflected off the work piece. The method includes mapping the second set of images to a computer design model of the work piece based on features depicted in the second set of images and the one or more predetermined positions of the imaging device. The method further includes determining a location of a defect on the work piece based on an analysis of the first set of images and the computer design model.

Optionally, the method also includes saving a record of the location of the defect on the work piece in a memory storage device.

Optionally, the method also includes constructing a three-dimensional feature map of the work piece on the computer design model displaying the defect.

Optionally, the one or more predetermined positions of the imaging device relative to the work piece include a first position of the imaging device and a second position of the imaging device. The imaging device in the second position has at least one of a different location or a different angle relative to the imaging device than the first position. Each of the first and second sets of images includes at least one image generated by the imaging device at the first position and at least one image generated by the imaging device at the second position. Optionally, the obtaining of the first set of images and the obtaining of the second set of images comprises controlling a robotic arm to move the imaging device relative to the work piece between the first position and the second position.

Optionally, the method also includes, responsive to receiving an identification of one or more discontinuity locations within at least one of the images in the first set, controlling a robotic arm to wipe the work piece along one or more regions of the work piece corresponding to the one or more discontinuity locations. Optionally, the first set of the images generated using the ultraviolet light setting includes a pre-wipe image and a post-wipe image. The pre-wipe image is generated by the imaging device at a first position of the one or more predetermined positions before the robotic arm is controlled to wipe the work piece, and the post-wipe image is generated by the imaging device at the first position after the work piece is wiped by the robotic arm. The analysis of the first set of images to determine the location of the defect on the work piece includes comparing the post-wipe image to the pre-wipe image.

Optionally, the second set of images is mapped to the computer design model of the work piece by performing image analysis via one or more processors to match features within the second set of images with corresponding features in the computer design model.

Optionally, the method also includes analyzing the first set of images via one or more processors to identify the defect in first set of images by measuring a fluorescent intensity of light within one or more images of the first set that exceeds a designated threshold intensity level.

Optionally, the method also includes activating an ultraviolet light source and deactivating a visible light source to generate the first set of images via the imaging device, and deactivating the ultraviolet light source and activating the visible light source to generate the second set of images via the imaging device.

In an embodiment, a method includes obtaining a first image of a work piece that has a fluorescent dye thereon. The first image is generated by an imaging device disposed at a first position relative to the work piece using an ultraviolet light setting in which the work piece is illuminated with an ultraviolet light to cause the fluorescent dye to emit light. The method includes obtaining a second image of the work piece that is generated by the imaging device disposed at the first position using a visible light setting in which the work piece is illuminated by a visible light. The method also includes mapping the second image to a computer design model of the work piece, and, responsive to receiving an identification of one or more discontinuity locations in the first image, controlling a robotic arm to wipe the work piece along one or more regions of the work piece that correspond to the one or more discontinuity locations in the first image based on the computer design model. The method includes obtaining a third image of the work piece generated by the imaging device disposed at the first position using the ultraviolet light setting subsequent to the robotic arm wiping the work piece, and identifying a defect on the work piece based on a comparison between the one or more discontinuity locations in the first image and corresponding locations in the third image.

Optionally, the method also includes obtaining a fourth image of the work piece generated by the imaging device disposed at the first position using the visible light setting subsequent to the robotic arm wiping the work piece. Responsive to identifying the defect on the work piece, the method includes determining a size of the defect and a location of the defect relative to the work piece based on an analysis of the third image and the computer design model.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An inspection system comprising:
   an imaging device;
   a visible light source;
   an ultraviolet light source; and
   one or more processors operably connected to the imaging device and the visible and ultraviolet light sources, the one or more processors configured to control the imaging device to generate a first set of images of a work piece that has a fluorescent dye thereon using an ultraviolet light setting in which the ultraviolet light source is activated to illuminate the work piece with an ultraviolet light to cause the fluorescent dye to emit light, the imaging device generating the first set of images at one or more predetermined positions relative to the work piece to monitor the light emitted by the fluorescent dye,
   wherein the one or more processors are configured to control the imaging device to generate a second set of images of the work piece using a visible light setting in which the visible light source is activated to illuminate the work piece with a visible light, the imaging device generating the second set of images at the same one or more predetermined positions relative to the work piece by monitoring the visible light reflected off the work piece such that the first and second sets of images have an equivalence relationship characterized by depicting common subject matter in a same perspective and frame of reference, and
   wherein the one or more processors are configured to map the second set of images to a computer design model of the work piece based on features depicted in the second set of images and the one or more predetermined positions of the imaging device, and
   the one or more processors analyze the first set of images to identify a discontinuity location within the first set of images that represents a potential defect on the work piece, and determine a location of the potential defect on the computer design model based on the equivalence relationship between the first and second sets of images and the mapping of the second set of images to the computer design model.

2. The inspection system of claim 1, wherein the one or more processors are configured to determine a size of the defect on the work piece based on the analysis of the first set of images, the equivalence relationship between the first and second sets of images, and the mapping of the second set of images to the computer design model.

3. The inspection system of claim 1, wherein the one or more processors are configured deactivate the visible light source and activate the ultraviolet light source to provide the ultraviolet light setting, and deactivate the ultraviolet light source and activate the visible light source to provide the visible light setting.

4. The inspection system of claim 1, wherein the one or more processors identify the discontinuity location in the first set of images by measuring a fluorescent intensity of light within one or more images of the first set that exceeds a designated threshold intensity level.

5. The inspection system of claim 1, further comprising a robotic arm, and wherein, responsive to identifying the discontinuity location within at least one of the images in the first set, the one or more processors are configured to control the robotic arm to wipe the work piece with a swab along one or more regions of the work piece corresponding to the discontinuity location.

6. The inspection system of claim 5, wherein the first set of images generated using the ultraviolet light setting includes a pre-wipe image and a post-wipe image, the one or more processors controlling the imaging device to generate the pre-wipe image at a first position of the imaging device prior to the robotic arm wiping the work piece and controlling the imaging device to generate the post-wipe image at the first position after the work piece is wiped by the robotic arm, and
   wherein the one or more processors classify the potential defect on the work piece by comparing the post-wipe image to the pre-wipe image.

7. The inspection system of claim 1, further comprising a robotic arm on which the imaging device is mounted, wherein the one or more processors control the robotic arm to move the imaging device relative to the work piece between a first position and a second position that has at least one of a different location or a different angle than the first position, wherein, at each of the first and second positions, the one or more processors control the imaging device to generate at least one image of the work piece using the ultraviolet light setting and at least one image of the work piece using the visible light setting.

8. The inspection system of claim 1, wherein the one or more processors are configured to generate, based on mapping the second set of images to the computer design model, a transfer function that converts coordinates in the second set of images to coordinates in the computer design model, and the one or more processors determine the location of the potential defect on the computer design model by applying the transfer function to coordinates of the discontinuity location within the first set of images.

9. A method comprising:
obtaining a first set of images of a work piece that has a fluorescent dye thereon using an ultraviolet light setting in which the work piece is illuminated with an ultraviolet light to cause the fluorescent dye to emit light, the first set generated by an imaging device at one or more predetermined positions relative to the work piece to monitor the light emitted by the fluorescent dye;
obtaining a second set of images of the work piece using a visible light setting in which the work piece is illuminated by a visible light, the second set generated by the imaging device at the same one or more predetermined positions relative to the work piece by monitoring the visible light reflected off the work piece such that the first and second sets of images have an equivalence relationship characterized by depicting common subject matter in a same perspective and frame of reference;
mapping the second set of images to a computer design model of the work piece based on features depicted in the second set of images and the one or more predetermined positions of the imaging device;
analyzing the first set of images to identify a discontinuity location within the first set of images that represents a potential defect on the work piece; and
determining a location of the potential defect on the computer design model based on the equivalence relationship between the first and second sets of images and the mapping of the second set of images to the computer design model.

10. The method of claim 9, further comprising constructing a three-dimensional feature map of the work piece on the computer design model displaying the potential defect at the determined location.

11. The method of claim 9, wherein the one or more predetermined positions of the imaging device relative to the work piece include a first position of the imaging device and a second position of the imaging device, the imaging device in the second position having at least one of a different location or a different angle relative to the imaging device than the first position, wherein each of the first and second sets of images includes at least one image generated by the imaging device at the first position and at least one image generated by the imaging device at the second position.

12. The method of claim 11, wherein the obtaining of the first set of images and the obtaining of the second set of images comprises controlling a robotic arm to move the imaging device relative to the work piece between the first position and the second position.

13. The method of claim 9, further comprising, responsive to identifying the discontinuity location within at least one of the images in the first set, controlling a robotic arm to wipe the work piece along one or more regions of the work piece corresponding to the discontinuity location.

14. The method of claim 13, wherein the first set of the images generated using the ultraviolet light setting includes a pre-wipe image and a post-wipe image, the pre-wipe image generated by the imaging device at a first position of the one or more predetermined positions before the robotic arm is controlled to wipe the work piece, the post-wipe image generated by the imaging device at the first position after the work piece is wiped by the robotic arm, and further comprising classifying the potential defect on the work piece by comparing the post-wipe image to the pre-wipe image.

15. The method of claim 9, wherein the second set of images is mapped to the computer design model of the work piece by performing image analysis via one or more processors to match features within the second set of images with corresponding features in the computer design model.

16. The method of claim 9, wherein the first set of images are analyzed to identify the potential defect by measuring a fluorescent intensity of light within one or more images of the first set that exceeds a designated threshold intensity level.

17. The method of claim 9, further comprising activating an ultraviolet light source and deactivating a visible light source to generate the first set of images via the imaging device, and deactivating the ultraviolet light source and activating the visible light source to generate the second set of images via the imaging device.

18. The method of claim 9, further comprising generating, based on the mapping of the second set of images to the computer design model, a transfer function that converts coordinates in the second set of images to coordinates in the computer design model, and the location of the potential defect on the computer design model is determined by applying the transfer function to coordinates of the discontinuity location within the first set of images.

19. A method comprising:
obtaining a first image of a work piece that has a fluorescent dye thereon, the first image generated by an imaging device disposed at a first position relative to the work piece using an ultraviolet light setting in which the work piece is illuminated with an ultraviolet light to cause the fluorescent dye to emit light;
obtaining a second image of the work piece that is generated by the imaging device disposed at the first position using a visible light setting in which the work piece is illuminated by a visible light such that the first and second images have an equivalence relationship characterized by depicting common subject matter in a same perspective and frame of reference;
mapping the second image to a computer design model of the work piece;
responsive to receiving an identification of a discontinuity location in the first image, determining an analogous location in the computer design model that corresponds to the discontinuity location in the first image based on the equivalence relationship between the first and second images and the mapping of the second image to the computer design model,
controlling a robotic arm to wipe the work piece along an area of the work piece that corresponds to the analogous location in the computer design model;
obtaining a third image of the work piece generated by the imaging device disposed at the first position using the ultraviolet light setting subsequent to the robotic arm wiping the work piece; and
identifying a defect on the work piece based on a comparison between the discontinuity location in the first image and image data in a location of the third image that corresponds to the discontinuity location in the first image.

20. The method of claim 19, further comprising, responsive to identifying the defect on the work piece, determining a size of the defect and a location of the defect relative to the work piece based on an analysis of the third image, the equivalence relationship between the first and second images, and the mapping of the second image to the computer design model.

\* \* \* \* \*